United States Patent

Srinivasan et al.

(10) Patent No.: US 7,325,170 B2
(45) Date of Patent: Jan. 29, 2008

(54) METHOD AND SYSTEM FOR PROVIDING INFORMATION FOR REMOTE DEVICE SUPPORT

(75) Inventors: Karamadai Srinivasan, Rocklin, CA (US); Rajpal Gill, Rocklin, CA (US); Thomas M. Tripp, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 10/804,290

(22) Filed: Mar. 19, 2004

(65) Prior Publication Data

US 2005/0216784 A1    Sep. 29, 2005

(51) Int. Cl.
G06F 11/00 (2006.01)
(52) U.S. Cl. .............................. 714/46; 714/4; 714/25; 714/26
(58) Field of Classification Search .................... 714/4, 714/25, 26, 46
See application file for complete search history.

(56) References Cited

U.S. PATENT DOCUMENTS

| | | | |
|---|---|---|---|
| 5,557,740 A | 9/1996 | Johnson et al. | |
| 6,243,833 B1 | 6/2001 | Hitchcock et al. | |
| 6,279,125 B1 * | 8/2001 | Klein | 714/38 |
| 6,434,616 B2 | 8/2002 | Urano et al. | |
| 6,538,996 B1 | 3/2003 | West et al. | |
| 6,584,502 B1 | 6/2003 | Natarajan et al. | |
| 6,598,179 B1 | 7/2003 | Chirashnya et al. | |
| 6,859,783 B2 | 2/2005 | Cogger et al. | |
| 6,950,964 B1 | 9/2005 | McMichael et al. | |
| 2002/0010803 A1 | 1/2002 | Oberstein et al. | |
| 2002/0059310 A1 | 5/2002 | Choi | |
| 2002/0067504 A1 | 6/2002 | Salgado et al. | |
| 2002/0152430 A1 | 10/2002 | Akasaka et al. | |
| 2003/0037288 A1 | 2/2003 | Harper et al. | |
| 2003/0229406 A1 | 12/2003 | Maity | |
| 2004/0098714 A1 | 5/2004 | Metz | |
| 2004/0122940 A1 | 6/2004 | Gibson et al. | |
| 2004/0123188 A1 | 6/2004 | Srinivasan et al. | |
| 2004/0243381 A1 * | 12/2004 | Kuturianu et al. | 703/22 |

* cited by examiner

Primary Examiner—Robert Beausoliel
Assistant Examiner—Charles Ehne

(57) ABSTRACT

A method and system gather information to facilitate the remote support of devices installed on a computer. For example, an exemplary method comprises first installing an information harvester and a formatter onto the computer. These are then used to identify and test the devices and to collect information about the devices and the testing. Then at least some of the collected information is formatted for display to the user and presentation to a support specialist. The formatted information is then displayed as part of a user display also having provision whereby a user may enter additional comments about device problems into the user display. If a user so chooses, the user comments may be collected, then the combined formatted collected information and the collected user comments are sent to a support specialist by means of a network transport mechanism such as e-mail, TCP, or the like.

12 Claims, 4 Drawing Sheets

Please complete the information below and click submit to email this information along with the harvested data to the call agent.

Name [                                    ]

Email Address [                                    ]

Please describe your problem

[                                                                                ]

[ SUBMIT ]    [ CANCEL ]

The following information has been harvested.

PointingDevice

| DeviceID | Description | DeviceStatus | DeviceErrorCode |
|---|---|---|---|
|  |  |  |  |

DiskDrive

| DeviceID | Description | DeviceStatus | DeviceErrorCode |
|---|---|---|---|
|  |  |  |  |

DesktopMonitor

| DeviceID | Description | DeviceStatus | DeviceErrorCode |
|---|---|---|---|
|  |  |  |  |

Network adapter

| DeviceID | Description | DeviceStatus | DeviceErrorCode |
|---|---|---|---|
|  |  |  |  |

*FIG. 4*

METHOD AND SYSTEM FOR PROVIDING INFORMATION FOR REMOTE DEVICE SUPPORT

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to devices connected to a computer internally or externally by a network, port, or other means of communication and interfaced to the computer by means of driver software or otherwise. In particular, the present invention relates to a method, apparatus, and means for providing information for the remote support of a computer device.

2. Description of the Related Art

When the personal computer was first introduced in the late 1970s and early-to-mid 1980s, peripheral devices such as printers, modems, scanners, hard drives, and other such accessories had to be custom designed to work with a specific type of PC. A printer, for example, required a hardware interface that connected with one of the proprietary ports of a given PC or that connected with a bus card that complied with the proprietary bus design of a given PC.

To enable programs to communicate with such devices, each device manufacturer needed to provide special device driver software. This special software established an interface between one or more particular software programs running on a given PC, such as a particular word processor, and that manufacturer's device, such as a particular printer. Preferably, this special device driver software established an interface to the operating system of the PC and communicated through the operating system with the particular software programs, so that only one device driver was needed for each device connected to a given PC. But in these early years, this interface could not always be arranged because of speed and other limitations of the early PC operating systems. Thus, separate device drivers were frequently required for each separate software program on each different PC.

Each device was connected to a particular type of port, such as a Centronics parallel port (PC) or RS-232 serial port (PC) or RS-422 serial port (Mac "serial port" and "local talk network"), or to a particular bus, such as the PC's ISA bus or the Apple's NuBus. Device drivers for each device communicated with that device by communicating with the port or the bus to which that device was connected.

By the early 1990s, the situation had improved somewhat with the introduction of fairly standardized hardware and software interfaces for such devices. These include the standardized Ethernet connector and its associated software, which can network to many peripheral devices; the standardized universal serial bus port (USB port) and its associated software, which also supports the addressing of many different devices; and the modern PC parallel port, which now supports several high-speed protocols for bi-directional communications between a PC and devices complying with IEEE Standard 1284. These interfaces have now displaced almost entirely the earlier proprietary ports, busses, and protocols on both Apple Macintosh and IBM PC compatible computers worldwide. In addition, modern operating systems on both Apple and IBM PC computers have standardized the interfaces between individual programs and all device drivers to such an extent that device drivers, while still having to be customized to the needs of particular devices, can now have a standard interface with the operating systems. Unfortunately, operating systems, even those from the same vendor, still come in several different and incompatible varieties each of which requires a customized device driver. Thus, a given manufacturer of, say, a particular type of printer may need to provide USB, parallel port, and Ethernet device drivers not only for the Macintosh and the PC compatibles but also for various operating system versions on each of these platforms.

Further advances have occurred in the abilities of operating systems to enumerate the specific identities of the various devices that may be connected to a computer at any given time. For example, through a protocol known as "Plug-and-Play," all of the modern Microsoft Windows operating systems, starting with version 95, are now able to interrogate their various buses and ports to determine what devices are connected to a computer. Devices have also been designed to respond to such enumeration requests by not only identifying themselves, but also by identifying in some manner the driver software which they require, such that operating systems may then prompt the user to find and present the appropriate driver software for installation as part of the operating system to support the operation of each such device.

All of this standardization has promoted keen competition among device product designers. They may equip their devices with one of a very small number of hardware interfaces, and then they need merely supply driver software appropriate to the device and matching the specifics of the operating system installed on a given PC. All of this has made it fairly simple to connect a new device, to install its driver, and to have them both operating. In most cases, a new device and its driver may be installed while a computer is operating, although the computer may need to be restarted to complete the driver installation.

Even given all of these advances, the vendors of devices still find that their users have a difficult time keeping the devices fully operative, and accordingly numerous telephone support requests are received from customers whose devices are not operating properly. Of these calls, only about 10 percent result from hardware-specific problems arising because of mechanical or electrical malfunctions of a device. The remainder of the calls relate to various software problems—about ninety percent of all calls received.

In many cases, the user's problem may be identified by performing simple tests to see if a device and its driver software are both installed, running, and communicating with the computer's operating system. Some problems may be solved by providing the user with a newer version of a driver or by reinstalling the existing driver. While skilled computer technicians can resolve these types of problems with little or no assistance, many computer owners, users, and operators lack the technical expertise to figure out how to detect and solve such problems on their own.

The software problems normally fall into one of the following scenarios:

The device was never installed properly.

The device is not able to communicate with the computer.

The device is using an incorrect driver. Typically, the customer has installed the device but has installed an incorrect driver, one not suited for the particular device.

The computer is using an older, outdated version of the driver. The driver vendor may have a newer version of the driver, but the customer does not know about this and is not benefiting from fixes and enhancements to the software.

The customer is using an incorrect driver for the operating system installed on the computer. This typically occurs when a customer upgrades to a different operating system and only then discovers that the drivers installed on the computer no longer work with the newly installed operating system.

The computer is using a device driver having a chosen human language that differs from that of the operating system and of the user. For example, an English language driver may be installed with an operating system that is set to work in Spanish for a Spanish speaking user.

The device driver did not successfully install completely. For example, some of its dependent files are not installed upon the computer or are otherwise damaged or incorrect.

Other device problems are possible. Some may be correctable by the user, but others may require the attention of a skilled technician.

A number of automated services are known that can assist one in detecting and correcting some of these problems. Among others, Microsoft's "Windows Update" service is now able to detect the drivers associated with the Windows 2000 and XP operating systems, check an external database of driver updates, and present the user with a list of suggested updated versions of driver software for installation on a computer. But other than proposing upgrades for drivers, this service does not otherwise assist in diagnosing hardware and software problems originating in devices, their drivers, or their connections, and in exploring and presenting possible solutions.

Hewlett-Packard has an "HP INSTANT SUPPORT" (service mark) which includes and uses software designed by Motive Communications, Inc. Briefly discussed, when a user requests support (from the "HP INSTANT SUPPORT" website), the user's computer downloads and receives a user support program named "TUNER" (a trademark of Motive Communications, Inc.). This TUNER program maintains an updated set of web pages (and the like) on the user's computer and assists the user with various self-service tasks as well as with seeking assistance.

However, this TUNER program has a number of limitations. The TUNER program is relatively large, a few megabytes, and either needs to be pre-installed or downloaded. For a user with a standard modem, such a download can take a significant amount of time, possibly leading to a greater number of failed downloads. This process may discourage some users from taking advantage of the service. Additionally, such a design is unsuited for computers with limited storage space, such as Personal Digital Assistants ("PDA's").

The TUNER program is also limited by its chat based design. When a user seeks assistance, an online chat dialog is established between the user and the support center in an attempt to trouble shoot the problem. Such a design requires that both the user and the support specialist are simultaneously available to discuss the possible problems and solutions. The support specialist is also under pressure to offer advice immediately, possibly without having time to fully research or think about the problem. In addition, for users using modems, such a design requires a possibly lengthy use of the user's phone line. Such limitations may make the support service inconvenient for the user and discourage some users from taking advantage of the service.

A further limitation of the TUNER program is that it requires the support specialist to be at a computer with "MOTIVE INSIGHT" (a trademark of Motive Communications, Inc.) installed on the computer. Not only does this requirement restrict the number of available support specialists by the number of computers with MOTIVE INSIGHT installed, it also reduces the ability of support specialist to provide support from locations outside the office, including from various client sites, from a support specialist's home, and from various hand-held computing devices such as PDAs.

Another way for a user to gain assistance is to contact a support center through a network, either by filling out an on-line form or by sending an e-mail to the support center. In either case, the user describes the problem they are having along with identifying the product they are using and waits for a response from the support center, which could either take the form of an automated response based on various criteria in the support request or a custom response created by a support specialist. However, unless the user has included specific information about the health of the device's drivers in their request, none of this information is available to help the support center trouble-shoot or suggest solutions based on driver information. The user is unlikely to include specific device and driver information in the request because the user is unlikely to know that it is relevant, where to find the information, and how to collect all of the relevant information.

SUMMARY OF THE INVENTION

An embodiment of the present invention can be found in a method for providing information for the remote support of one or more devices connected to a computer. The method comprises installing an information harvester and formatter onto the computer, using the information harvester to identify and to test the one or more devices and to collect information about the devices and the testing, and then using the formatter to format at least some of the collected information for display to the user and presentation to a support specialist. The formatted information is then displayed as part of a user display that also has provision whereby a user may enter additional comments about device problems into the user display. Then, if the user so chooses, any comments the user provides are collected, and then the combined formatted collected information and the collected user comments are sent to a support specialist by means of a network transport mechanism such as e-mail, TCP, or the like.

BRIEF DESCRIPTION OF THE DRAWINGS

FIG. 4 is a possible screen shot for submitting a support request according to an embodiment of the present invention.

DETAILED DESCRIPTION

An embodiment of the present invention is designed to be implemented as part of an online support service that is provided by a service provider that may be a device vendor, a computer vendor, or an operating system vendor to it's customers. Such a service can also be offered by a third party. The service acts as a remote support center for customers in need of computer support.

A user sitting at a computer and desiring computer support services begins by turning on the computer's Internet browser and then communicating over the Internet with the web site of the support center. The user first selects "Service" and then "Remote E-mail Support."

After clicking on "Remote E-mail Support" the user is prompted that better support can be provided if detailed device information is attached to the support request. The user is given the option of using a network application that will test the devices connected to the user's computer and attach detailed device information to the support request. The user is then prompted to fill out a form describing the particular problem the user is experiencing. Alternatively, the user could fill out the form before deciding whether to take advantage of the network application's diagnostic features. After submitting the support request, the user waits for a response from the support center suggesting possible solutions.

Figure 1:
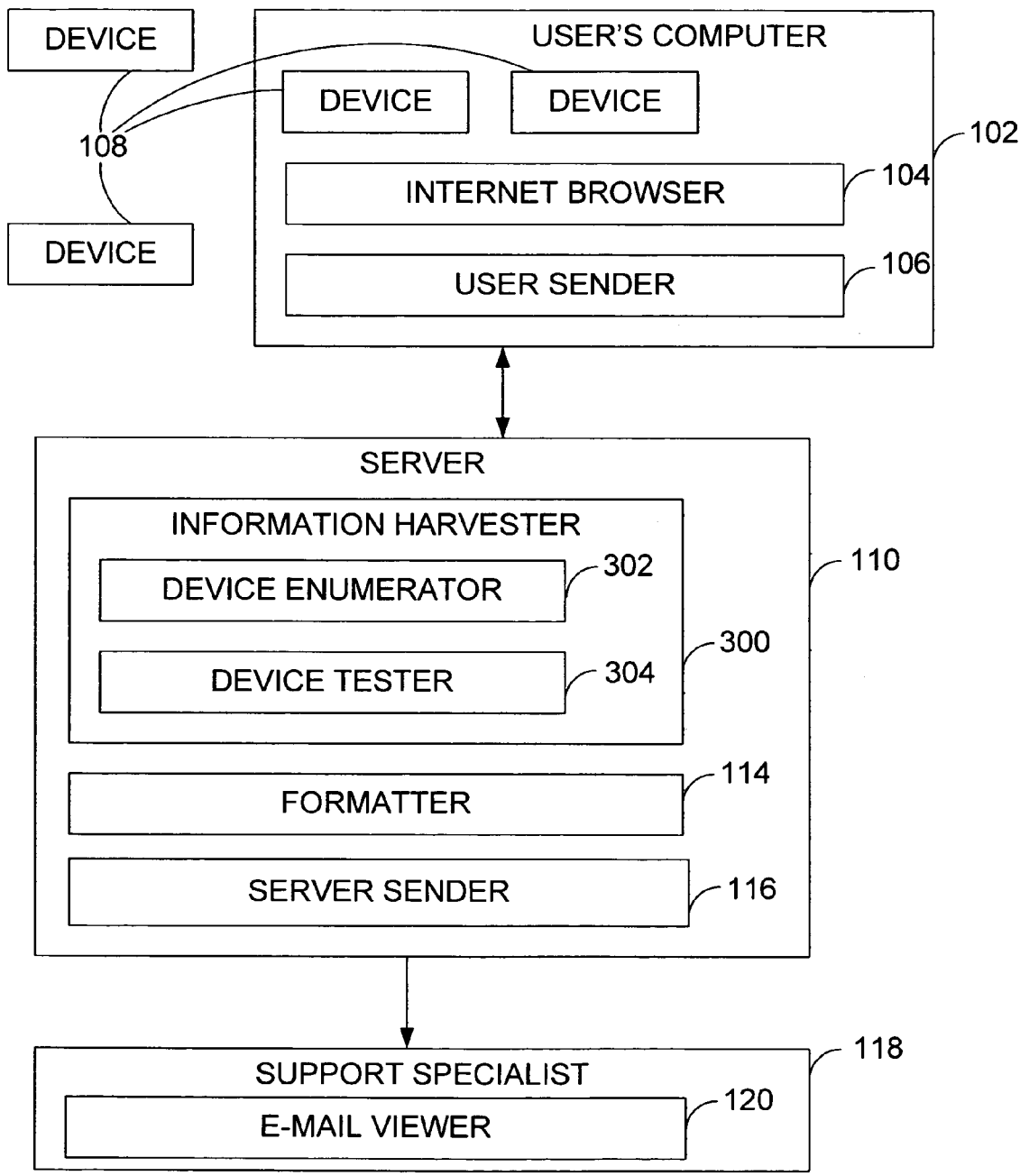
FIG. 1 is a block diagram illustrating the various elements in the present embodiment.

Now referring to FIG. 1, a possible configuration of the various elements of the present embodiment are shown. Located on a user's computer 102 are a number of devices 108 connected both internally and externally to the user's computer 102. Also located on the user's computer is a network browser 104 such as Microsoft Explorer or Netscape Navigator. The user's computer 102 is capable of transmitting information to a server 110 through a user sender 106. The user sender 106 can take the form of an E-mail application, FTP program, or any other means of transmitting information to the server 110. The user sender 106 can also be part of the network browser 104 by using HTTP/HTTPS to post the information to an ASP page on the server 110. One advantage of this approach is that the user's computer 102 only needs the network browser 104 pre-installed on their machine to take advantage of the invention.

The server 110 contains an information harvester 300, a formatter 114, and a server sender 116. The server 110 is connected to the user's computer 102 and a support specialist 118. The connection can be by Internet, network, or other means of communication. The server 110 can also be the support specialist 118. While FIG. 1 shows only a one-way connection between the server 110 and the support specialist 118, a two-way connection is also possible. Additionally, the support specialist 118 can be connected directly to the user's computer 102. In the present embodiment, the user's computer 102 is a computer system running a Windows operating system; however, it could equally be running a different operating system.

The information harvester 300 can be a network application such as a Java Applet, ActiveX Control (a trademark of Microsoft Corporation), or other browser plug-in. Such a design allows the network browser 104 on the user's computer 102 to run the information harvester 300 without the user needng to specifically download and install the information harvester 300, making the process more user friendly. With the use of a network application, the information harvester 300 is downloaded and temporarily stored by the Internet browser 104 in the same way that a graphic image is downloaded and temporarily stored when a web page is viewed. Another advantage of such an approach is that it allows computers with scarce storage space to immediately recover storage space after the execution of the information harvester 300. The information harvester 300 could alternatively be pre-installed on the user's computer 102.

The information harvester's 300 purpose is to gather information about the devices 108 and their associated drivers from querying the user's computer 102. (See Appendix B). The information harvester 300 may contain a device enumerator 302 and a device tester 304. The device enumerator 302 allows the information harvester 300 to identify the devices 108 connected to the user's computer 102. The device tester 304 allows the information harvester 300 to gather detailed information about a device 108. Such information may include the device ID, device description, device status, device error code, manufacturer, model, size, interface type, driver used, serial number, and any other information that can be obtained from the user's computer system 102. The type and amount of information gathered by the device tester 304 may depend on the type of device 108 tested. For example, the device tester 304 may gather information from a monitor such as the monitor's size, resolution, refresh rate, manufacturer, etc. On the other hand, the device tester 304 may gather information from a hard drive such as the hard drive's total storage capacity, free space, speed, manufacturer, etc.

In the present embodiment, the device enumerator 302 and the device tester 304 use standard Windows APIs (application programming interface) to perform their enumeration and testing functions instead of proprietary APIs. One advantage to this design is that the information harvester 300 can be much smaller in size. Not only does this smaller size allow the information harvester 300 to be used on computers with limited storage space, such as a PDA, but it also permits the information harvester 300 to be run by the network browser 104 without a lengthy download time and possible failed downloads, especially for users that rely on a modem as their means for connecting to the network. Alternatively, the device enumerator 302 and device tester 304 could rely on their own proprietary APIs or a combination of proprietary APIs and standard APIs.

The formatter 114, located on the server 110, converts the output of the information harvester 300 into a format that can be read and understood by a person. In the present embodiment, the formatter 114 is also a network application that is run by the user's Internet browser 104, converting the information into an HTML page. (See Appendix A). While the formatter 114 in the present embodiment uses an HTML page, the information could be formatted into any number of formats which allow the information to be organized and accessed. Alternatively, the information gathered by the information harvester 300 could be first sent to the server 110 via the user sender 106 before being formatted by the formatter 114. In such a case, the formatter 114 would not need to be a network application. However, such a design forces the user to transmit the gathered information to the server 110 before the user may have a chance to review the information that was gathered.

The HTML document can be created and formatted such that it can be viewed and understood by both the user and the support specialist 118. Alternatively, the formatter 114 could create two documents, one to be shown to the user in a non-technical format and one to be used by the support specialist containing more detailed technical information.

The server sender 116, located on the server 110, attaches the file created by the formatter 114 to an E-mail containing the user's own description of the problem, which is then sent to the support specialist 118. If the user sender 106 originally transmitted the information to the server 110 as an E-mail already, the server sender 116 may simply forward the E-mail to the support specialist 118. In the case where the support specialist 118 is the server 110, no server sender 116 may be needed. In the present embodiment, the server sender 116 attaches to an E-mail containing the user's own description of the problem the HTML document created by the formatter 114 and posted to the server's network-page by the user sender 106. (See Appendix C). The E-mail is then sent to the support specialist 118 by the server sender 116.

The support specialist 118 can be the terminal of a live technical support person. However, the support specialist 118 need not be a live person. The user could interact with an artificial support specialist 118 consisting of a computer that is programmed to send pre-determined suggestions in response to particular requests for support. The support specialist 118 contains an E-mail viewer 120. The viewer can be any of the commercial or free E-mail viewers on the market, such as Microsoft Outlook, or Eudora. One of the advantages of transmitting the information to the support specialist 118 as an E-mail is that since most computers contain an E-mail viewer 120 or have network access where an E-mail viewer can be accessed from a web page, the support specialist 118 need not be confined to a proprietary program installed on a limited number of specific computers in order to access and respond to support requests. This freedom allows the support specialist 118 to be able to access and respond to support requests from a dedicated support center, from the specialist's home computer, from a computer accessed on the road such as a client's computer, from a public access computer, or even from a hand-held computer, such as a PDA.

Figure 2:
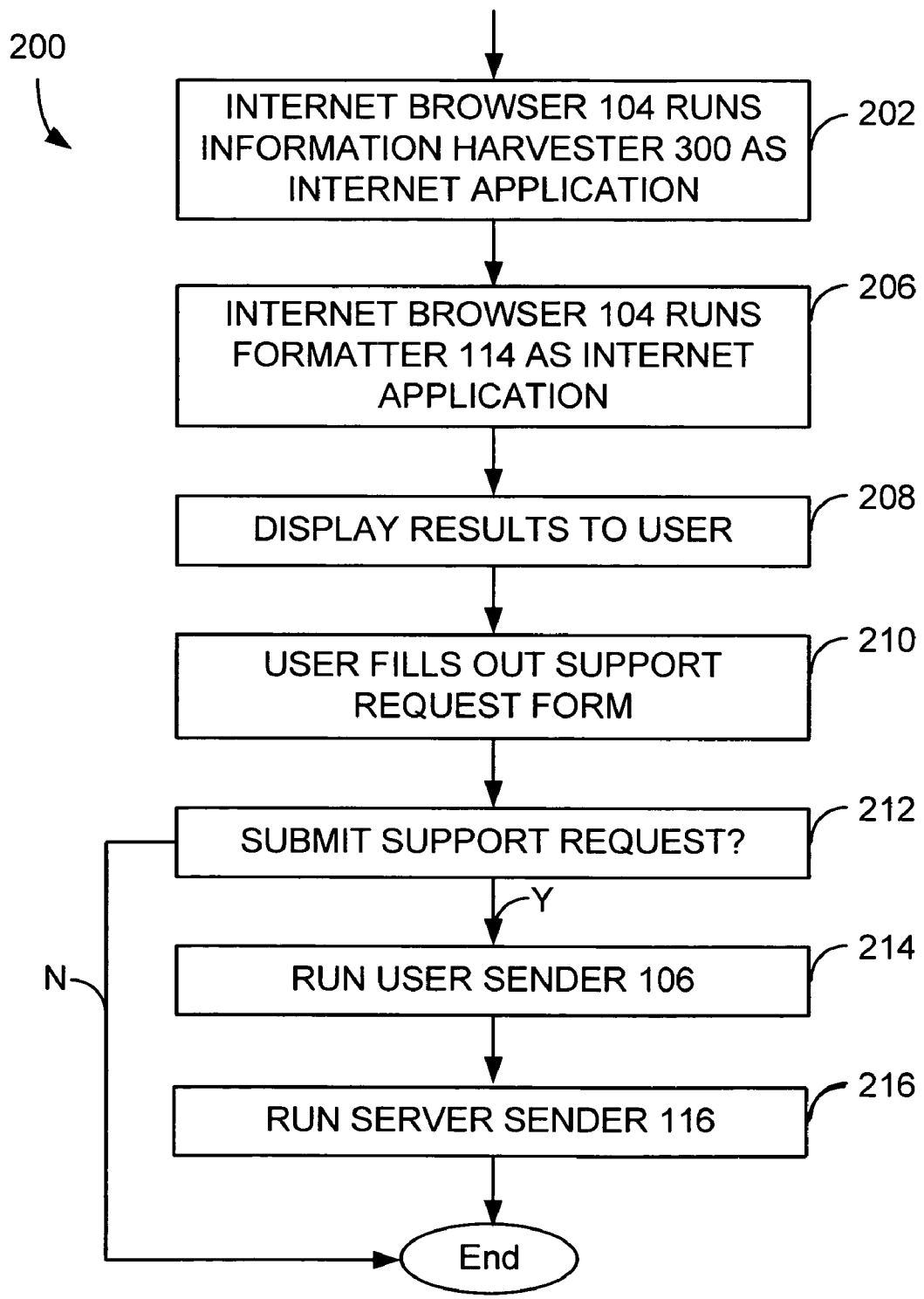
FIG. 2 is a flow chart illustrating the operation of the present embodiment of the present invention.

Now referring to FIG. 2, the operation of an embodiment of the present invention is shown. Starting at step 202, the user's network browser 104 runs the information harvester 300 as a network application gathering detailed information about the devices 108 connected to the user's computer 102. At step 206, the Internet browser 104 runs the formatter 106 as a network application formatting the results of the information harvester 300 into an HTML document. At step 208, the HTML document is displayed to the user. At step 210, the user fills out a support request form through the network browser 104. The user may describe what device 108 is causing trouble and what problem the user is experiencing with that device 108. The user could also include other information such as steps the user has already taken to try and repair the device 108. Step 206 can also be done before running the information harvester 300 at step 202.

At step 212, the user, after reviewing the information collected from the user's computer 102, has the option of submitting the request along with the collected information or canceling the support request. If the user selects cancel, the support request ends. If the user selects submit, the program proceeds to step 214. Alternately, the user may be given the option of submitting only the user's description of the problem and none or only a portion of the collected information.

At step 214, the support request is sent to the server 110 through the user sender 106. Both the user-supplied information and the information collected from the user's computer 102 are sent to the server 110. In the present embodiment, the user sender 106 posts the user-supplied information and the HTML page to an ASP page located on the server using HTTP/HTTPS. However, any form of transmission may be used.

At step 216, the server 110 sends an E-mail containing the combined information to the support specialist 118 through the server sender 116. In the present embodiment, this sending is done through the creation of an E-mail containing the user supplied information, with the HTML page created by the formatter 114 attached to the E-mail.

After the server 116 sends the E-mail at step 216, the present embodiment finishes. The user waits for the support specialist 118 to view the support request on the E-mail viewer 120 and to communicate possible solutions to the user's problems through e-mail or other form of communication.

Figure 3:
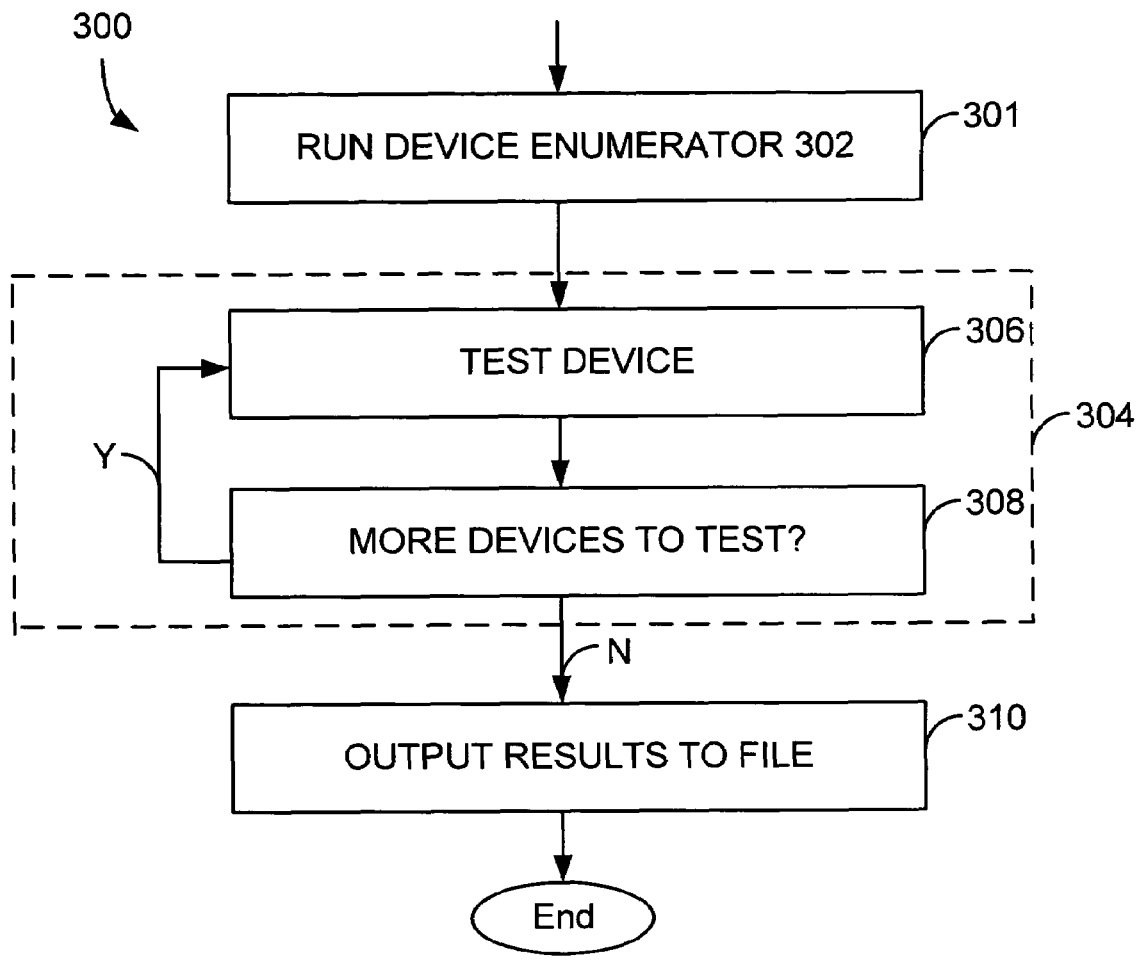
FIG. 3 is a flow chart illustrating the information harvester used in the present embodiment.

Now referring to FIG. 3, the information harvester 300 is further described. In the present embodiment, at step 301 the information harvester 300 first runs the device enumerator 302 to identify the devices 108 connected internally or externally to the user's computer 102. The device enumerator 302 may gather such information as the device ID and device description for each device 108 identified. The information harvester 300 then calls the device tester 304. At step 306, the device tester 304 first tests a device found by the device enumerator 302, collecting information about the device status, device error code, and any other relevant information such as the model number, the manufacturer, the size, or other information. At step 308, the device tester 304 determines if there are more devices 108 found by the device enumerator 302 that need to be tested. If there are more devices 108 yet to test, the information harvester 300 branches back to step 306. If there are no more devices 108 to test, the information harvester 300 branches to step 310. At step 310, the information collected by the diagnostic tester 300 is outputted as a file. In the present embodiment, the file is an XML data file. Additionally, in the present embodiment, most of the functions of the device enumerator 302 and device tester 304 are accomplished through the use of standard Windows APIs.

While FIG. 3 shows one embodiment of the information harvester 300, other embodiments are possible. The present device tester 304 relies on querying the operating system to test each device 108 and report the needed information. The device tester 304 could instead self test each device 108, without relying on the operating system to provide the information or use self tests to provide information not available from the operating system. Further, the device enumerator 302 need not identify all devices 108 connected to the user's computer 102. The user could identify or select which devices 108 the user wanted support for, and only those devices 108 would be tested by the device tester 304.

Now referring to FIG. 4, a possible screen shot from the network browser 104 is shown. For each device 108 found by the device enumerator 302, the information collected by the device tester 304 is displayed to the user, as shown in the bottom half of FIG. 4. The list of devices 108 may be more than can fit on one screen and may require the user to scroll down or access multiple screens to view the information for all of the devices 108. Additionally, for each device 108, FIG. 4 only shows the device ID, description, device status, and device error code. Much more information could be displayed, and what information is displayed could vary for different devices 108.

In the present embodiment, the user is shown the screen shot displayed in FIG. 4 at step 208 in FIG. 2. The information for each device will be given. The user will then enter their name and email address in the appropriate boxes and describe the user's problem in the user's own words as described for step 210 in FIG. 2. If the user decides not to submit the support request, the user will click the cancel button. If the user decides to submit the support request, the user will click the submit button. In the present embodiment, FIG. 4 is displayed as an HTML page, and is located on the user's computer 102. Only if the user clicks submit is the information displayed on this HTML page transmitted to the server 110. This arrangement has the added security benefit of letting the user decide whether or not to transmit detailed information about the user's computer 102 after being able to review the information. Alternatively, the information could be displayed as a web page from the server 110. The information could also be displayed to the user in some non-HTML format.

It is possible for many of the various elements of and steps carried out by the invention to be combined into one or more scripts or computer programs. For example, the formatter 114 could be included as part of the information harvester 300 and the user sender 106 could be incorporated into the network browser 104, or they could be made part of or be associated with some other system element, or made an independent program or script.

In brief summary, the invention provides a novel system for providing information for the remote support of computer devices and their software drivers. Several embodiments and other variations of the invention have been described and illustrated, but the invention is not limited to the specific forms and arrangements described and illustrated above. It will be apparent to those of ordinary skill in the art that the invention can be modified in its arrangement and details without departing from its true spirit and scope, as defined by the appended claims.

APPENDIX A

A portion of an embodiment of the formatter 114

```
package hp.xml;
import java.io.*;
import java.util.*;
import java.util.StringTokenizer;
import hp.xml.AttributeList;
import hp.xml.HandlerBase;-
import hp.xml.SAXException;
public class SAXParser
{
    public FileInputStream fin;
    private HandlerBase clientHandle;
    private String filepath="";
    public SAXParser(String fp) throws SAXException
    {
        System.out.println("In SAX Parser constructor");
        try{
            filepath = fp;
        }catch(Exception e){
            throw new SAXException("File not found");
        }
    }
    public void setDocumentHandler(HandlerBase handle)
    {
        clientHandle = handle;
    }
    private String getFirstNonBlankChar(String str) throws
    SAXException
    {
        try
        {
            // get the char after the "<" tag
            String s = str.substring(0,1);
            if(s.equals(" ")) getFirstNonBlankChar(str.substring(1,
            str.length( )));
            return s;
        }catch(Exception e){
            throw new SAXException("Error in finding first non
            blank char in line : "+ str);
        }
    }
    private String getLastNonBlankChar(String str) throws
    SAXException
    {
        try{
            // get the char after the "<" tag
            String s = str.substring(str.length( )-1,str.length( ));
                if(s.equals(" ")) getLastNonBlankChar(str.substring(0,
                str.length( )-1));
                return s;
        }catch(Exception e){
            throw new SAXException("Error in finding last non blank char
            in line : "+ str);
```

APPENDIX A-continued

A portion of an embodiment of the formatter 114

```
    }
}
private int getKeyValueCount(String test)
{
    int count = 0;
    char chars[ ] = test.toCharArray( );
    char check='=';
    for(int i = 0;i<chars.length;i++)
    {
        if(chars[i]==check) count = count + 1;
    }
    return count;
}
private String extractKeyValuePairs(String test,AttributeList at)
throws SAXException
{
    try{
        String key = test.substring(0,test.indexOf("=")).trim( );
        if(key.indexOf(" ")!=-1)
        {
            // There might be two words, take the second
            key = key.substring(key.lastIndexOf(" "),key.length( ));
        }
        String value = "";
        test = test.substring(test.indexOf("=") + 1, test.length( )).trim( );
        if(test.startsWith("\""))
        {
            // starts with quote
            test = test.substring(1,test.length( ));
            value = "\"" + test.substring(0,test.indexOf("\"") + 1);
            test = test.substring(test.indexOf("\"") + 1, test.length( ));
        }
        else
        {
            // no quote
            value = test.substring(0,test.indexOf(" "));
            test = test.substring(test.indexOf(" "),test.length( ));
        }
        //System.out.println("Key is = " + key.trim( ) + "
        value = "+ value.trim( ));
        at.setKeyValue(key.trim( ),value.trim( ));
        return test;
    }catch(Exception e){
        throw new SAXException("Error in finding Key Value
        pairs " + test);
    }
}
private void processStartElement(String ElementHead) throws
SAXException
{
    String name ="";
    AttributeList at = new AttributeList( );
    try{
        // Remove opening and closing tags
        ElementHead = ElementHead.substring(1,
        ElementHead.length( )-1).trim( );
        int count = getKeyValueCount(ElementHead);
        //System.out.println(count);
        if(count ==0)
        { // no attributes
            name = ElementHead.trim( );
        }
        else
        {
            name = ElementHead.substring(0,
            ElementHead.indexOf(" ")).trim( );
        }
        for(int i = 0;i<count;i++)
        {
            ElementHead=extractKeyValuePairs(ElementHead,at);
        }
        //System.out.println("Attribute List = " +
        at.getKeyValuePairs( ));
        clientHandle.startElement(name,at);
    }catch(Exception e){
        throw new SAXException(" Error in Element
        Head : " + ElementHead);
```

APPENDIX A-continued

A portion of an embodiment of the formatter 114

```
      }
    }
    private void processEndElement(String line) throws SAXException
    {
      try{
        String name = line.substring(line.indexOf("/") + 1,
        line.length( )-1);
        clientHandle.endElement(name);
      }catch(Exception e){
        throw new SAXException("Error in process End
        Element " + line);
      }
    }
    private void processCharacters(String NodeData) throws
    SAXException
    {
      try{
clientHandle.characters(NodeData.toCharArray( ),0,
NodeData.toCharArray( ).length);
      }catch(Exception e){
        throw new SAXException("Error in process
        Characters " + NodeData);
      }
    }
    private String processElement(String line) throws SAXException
    {
      try{
        if(line.startsWith("<"))
        {
          // can be either a start or end element
if(getFirstNonBlankChar(line.substring(1,line.length( ))).equals("/"))
          {
            //System.out.println("End element detected");
            String EndElement = line.substring(0,
            line.indexOf(">") + 1);
            processEndElement(EndElement);
          }
          else
          {
            //System.out.println("Start element detected");
            String StartElement = line.substring(0,line.indexOf(">") + 1);
            processStartElement(StartElement);
          }
          line = line.substring(line.indexOf(">") + 1,line.length( ));
        }
        else
        {
          String NodeData = line.substring(0,line.indexOf("<"));
          if(NodeData!=""||NodeData!=null)
          processCharacters(NodeData);
          line = line.substring(line.indexOf("<"),line.length( ));
        }
        return line;
      }catch(Exception e){
        throw new SAXException("Error in finding process
        Element : "+ line);
      }
    }
    private void processNode(String line) throws SAXException
    {
      try{
        line = line.trim( );
        while(line.length( )!=0)
        {
          line = processElement(line);
        }
      }catch(Exception e){
        throw new SAXException("Error in process node " + line);
      }
    }
    private boolean checkParserIgnoreTags(String line) throws SAXException
    {
      try{
        line = line.trim( );
        if(line.indexOf("<!--")!=-1 || line.indexOf("<?")!=-1)
        {
          if(line.indexOf("<")!=0)
          {
            throw new SAXException("Parse Error : " + line +
            "should be in new line");
          }
          return true;
        }
        else
        {
          return false;
        }
      }catch(Exception e){
        throw new SAXException("Error in check parse ignore
        tags : "+ line);
      }
    }
    public boolean parseFile( ) throws SAXException
    {
      try{
        fin = new FileInputStream(filepath);
      }catch(Exception e){
        System.out.println("Error : Unable to open file " + e);
        throw new SAXException(" File not found");
      }
      DataInputStream din = new DataInputStream(fin);
      String xmlfile = "";
      String line;
      try{
        while((line=din.readLine( ))!=null)
        {
          if(line=="" || line==null) continue;
          if(checkParserIgnoreTags(line))
          {
            continue;
          }
          xmlfile = xmlfile + line.trim( );
        }
        processNode(xmlfile);
      }catch(Exception e){
        throw new SAXException("Error in parse file");
      }
      return true;
    }
    public void startElement(String name, AttributeList at) throws
    SAXException
    {
      try{
        System.out.println("In start Element : NAME= " + name +
" Attribute = " + at.getKeyValuePairs( ));
      } catch(Exception e){
        throw new SAXException("Error in start element");
      }
    }
    public void endElement(String name) throws SAXException
    {
      try{
        System.out.println("In End Element : NAME= " + name);
      }catch(Exception e){
        throw new SAXException("Error in end element");
      }
    }
    public void characters(char[ ] ch,int start,int length) throws
    SAXException
      {
        String value = "";
        try{
        value = value + new String(ch,start,length);
        }catch(Exception e){
          throw new SAXException("Error in characters");
        }
      }
/*
    public static void main (String[ ] args)
    {
      System.out.println("In main");
      try{
      SAXParser xp = new SAXParser(args[0]);
      xp.setDocumentHandler(this)
```

APPENDIX A-continued

A portion of an embodiment of the formatter 114

```
            }catch(SAXException e){ }
        }
*/
}
```

APPENDIX B

A porion of an embodiment of the information harvester 300

```
import java.awt.*;
import java.io.*;
import java.net.URL;
import java.lang.*;
import java.applet.*;
public class EmailSupport extends Applet implements Runnable
{
    DataOutputStream dos;
    String workingDir="";
    String StatusStr = "";
    String Msg = "";
    Thread th;
public void init( ) {
    String userdir = System.getProperty("user.dir");
    workingDir = userdir.substring(0,3) + "temp";
}
public void start( )
{
    if(th==null)
    {
        th = new Thread(this);
        th.start( );
    }
}
public void extractFiles( )
{
    try
    {
        Msg = "Downloading diagnostic files";
        String fileList[ ] = new String[10];
        fileList[0] = "smstub16.exe";
        fileList[1] = "dscan16.dll";
        fileList[2] = "dscan32.dll";
        fileList[3] = "zlib.dll";
        fileList[4] = "HPAsset.exe";
        int count = 0;
        ClassLoader cl= this.getClass( ).getClassLoader( );
        if(cl==null)
        {
            StatusStr ="Error Could not get class loader";
            repaint( );
            return;
        }
        for(int i = 0;i<=4;i++)
        {
            System.out.println("Extracting file :" + fileList[i]);
            InputStream in = cl.getResourceAsStream(fileList[i]);
            if(in==null)
            {
                StatusStr ="Input stream reader is null";
                System.out.println("Error: unable to extract :" + fileList[i]);
                repaint( );
                return;
            }
            String outfile = workingDir + "\\"+fileList[i];
            BufferedInputStream instream = new
                java.io.BufferedInputStream(in);
            BufferedOutputStream outstream = new
                java.io.BufferedOutputStream(new
java.io.FileOutputStream(outfile));
            int input;
            Object ow=null;
            try{
                while(instream.available( ) == 0)
                {
```

APPENDIX B-continued

A porion of an embodiment of the information harvester 300

```
                    ow.wait(200);
                    System.out.println("waiting for input stream");
                }
            }catch(Exception e){System.out.println("waiting for input
stream");}
            while ((input = instream.read( )) != -1)
            {
                outstream.write(input);
            }
            outstream.flush( );
            outstream.close( );
            instream.close( );
            count = count + 10;
            StatusStr = count + "% completed";
            repaint( );
        }
    }
    catch(SecurityException e)
    {
        StatusStr = "Security Exception caught!!";
    }
    catch(IOException io)
    {
        StatusStr = "IO Exception caught";
    }
}
public void runHPAssetAgent( )
{
    try{
        Msg = "Harvesting system information";
        Process proc = Runtime.getRuntime( ).exec(workingDir +
           "\\HPAsset.exe");
        proc.waitFor( );
        System.out.println("Exit value of HPAssetAgent is :" +
        proc.exitValue( ));
        StatusStr = "80% complete";
        repaint( );
    }catch(Exception e){
        StatusStr ="Error running HPAsset agent";
    }
}
public void parseResultFile( )
{
    HPASSETAGENT ag = new HPASSETAGENT(workingDir +
    "\\hpasset.xml",workingDir +"\\email.html");
    ag.parseResult( );
    StatusStr = "100% complete. Please wait ..";
    repaint( );
}
public void run( )
{
    extractFiles( );
    runHPAssetAgent( );
    parseResultFile( );
    try{
        System.out.println("file:///" +workingDir + "/email.html");
        getAppletContext( ).showDocument(new URL("file:///" +
        workingDir + "/email.html"));
        System.out.println("file:///" +workingDir + "/email.html");
    }catch(Exception e){
        StatusStr = "Error: Unable to redirect page ";
        repaint( );
    }
}
public void paint(Graphics g)
{
    g.setColor(Color.orange);
    g.drawRect(0,0,200,50);
    g.setColor(Color.white);
    g.fillRect(0,0,getBounds( ).width,getBounds( ).height);
    g.setColor(Color.black);
    g.drawString(Msg,10,20);
    g.drawString(StatusStr, 10, 40);
```

APPENDIX C

A portion of an embodiment of the server sender 116

```
<%
Dim objCDOMail 'The CDO object
strTo = "support_specialist@hp.com"
strSubject = "Active email support request"
strBody = "<html><body><table><tr><td>name</td><td>" &
Request.Form("name")&"</td></tr>"
strBody = strBody & "<tr><td>Problem Description</td><td>" &
Request.Form("problem")&"</td></tr>"
strBody = strBody & "<tr><td colspan=2>" &
Request.Form("harvestInfo")&"</td></tr></table>"
strBody = strBody & "</body></html>"
'Response.write "This is what was recieved <br>" & strBody
Set objCDOMail = Server.CreateObject("CDONTS.NewMail")
objCDOMail.From    = Request.Form("email")
objCDOMail.To      = strTo
objCDOMail.Subject = strSubject
objCDOMail.Body    = strBody
objCDOMail.BodyFormat = 0 ' CdoBodyFormatHTML
'Outlook gives you grief unless you also set:
objCDOMail.MailFormat = 0 ' CdoMailFormatMime
objCDOMail.Send
Set objCDOMail = Nothing
%>
<html>
<body>
<center>
<font face = verdana size=2><b>Your support request has been mailed
to a support analyst,along with your system information.
</center>
</body>
</html>
```

What is claimed is:

1. A method for providing information for the remote support of one or more devices connected to a user's computer, comprising:

installing an information harvester and a formatter on the computer;

using the information harvester, enumerating, identifying, and testing at least some of the devices connected to the user's computer, using the standard APIs of the operating system installed on the computer to execute at least some of the testing steps, and collecting information about the devices and any results of the testing;

formatting at least some of the collected information for display to the user and presentation to a support specialist;

displaying the formatted information as part of a user display also having provision whereby the user may enter additional comments about device problems into the user display;

if the user so chooses, collecting any comments that the user provides and sending the combined formatted collected information and the collected user comments to a support specialist by means of a network transport mechanism.

2. The method of claim 1, wherein the using the information harvester step further comprises:

using a network browser located on the user's computer to run the information harvester as a network browser application.

3. The method of claim 1, wherein the using an information harvester step further comprises outputting the results of enumeration and testing to a file;

the formatting, displaying, collecting and sending steps further comprise reading the file, formatting at least some of the XML formatted data it contains, and then displaying the formatted data as part of a document Suitable for user display and including at least one text entry window or other user input arrangement into which the user may add additional comments; and if the user so chooses, sending this document, complete with any added user comments, to a support specialist.

4. The method of claim 3, the sending step further comprising:

sending the collected information from the user's computer to a server; and sending the collected information from the server to the support specialist.

5. The method of claim 1, the sending step further comprising:

sending the collected information from the user's computer to a server; and sending the collected information from the server to the support specialist.

6. The method of claim 1, further comprising:

formatting the user display as a document; and if the user so chooses, sending this document to a support specialist as an e-mail attachment.

7. The method of claim 6, the sending step further comprising:

sending the e-mail and its attachment from the computer to a server; and forwarding the e-mail and its attachment, or sending another e-mail with this same attachment, from the server to the support specialist.

8. The method of claim 1, the sending step further comprising:

sending the combined formatted collected information and the collected user comments from the user's computer to a server by means of a network transport mechanism; and sending this same information and comments from the server to the support specialist also by means of a network transport mechanism.

9. A system for providing information for the remote support of one or more devices connected to a user's computer having an operating system, said system comprising:

an information harvester installed on the computer and arranged to identify and test the one or more devices and to collect information about the devices and the testing, the information harvester comprising a device enumerator that enumerates and identifies the devices connected to the user's computer and a device tester that determines whether any given device is working properly and using the standard APIs of the computer's operating system to perform at least some of the deivce tests;

a formatter installed on the computer and arranged to reformat the collected information into a format suitable for display to the user and presentation to a support specialist;

a network browser installed on the computer that can display web pages;

one or more web pages installed on the computer and arranged to permit the network browser both to display the reformatted collected information and also to accept additional comments from the user; and a user sender that can, at the option of the user, send one or more web pages, complete with reformatted collected information and any additional comments from the user, to a support specialist by means of a network transport mechanism.

10. The system of claim 9, wherein the information harvester and formatter are designed so that they may run under the control of the network browser.

11. The system of claim 10, wherein the information harvester is designed to output a file containing XML formatted data indicating the results of enumeration and testing, the formatter reads the file, reformatting at least some of the XML formatted data it contains, and the one or more web pages incorporate the formatted data from the file as the reformatted collected information that is displayed.

12. A system for providing information for the remote support of one or more devices connected to a user's computer, said system comprising:

information harvesting means for identifying and testing the one or more devices and for collecting information about the devices and the testing, the information harvesting means comprising device enumerator means for identifying the devices connected to the user's computer and device tester means for determining whether any given device is working properly and using the standard APIs of the computer's operating system to perform at least some of the device tests;

formatting means for reformatting the information collected by the harvesting means for display to the user and for presentation to a support specialist;

a network browser installed on the computer with the capability of displaying network pages;

network page display means utilizing the network browser for displaying one or more network pages containing the formatted information, the network pages including user data input means for accepting comments from the user; and user sending means for, at the option of the user, sending the reformatted collected information and any additional comments provided by the user to a support specialist by means of a network transport mechanism.

* * * * *

UNITED STATES PATENT AND TRADEMARK OFFICE
CERTIFICATE OF CORRECTION

| | | |
|---|---|---|
| PATENT NO. | : 7,325,170 B2 | |
| APPLICATION NO. | : 10/804290 | |
| DATED | : January 29, 2008 | |
| INVENTOR(S) | : Karamadai Srinivasan et al. | |

It is certified that error appears in the above-identified patent and that said Letters Patent is hereby corrected as shown below:

In column 15, line 30, below "</html>" insert

--

APPENDIX D

A portion of an embodiment of the device tester 304

```
#include <windows.h>
#include <tchar.h>
#include <stdlib.h>
#include <stdio.h>
#include <setupapi.h>
#include <cfgmgr32.h>
#include <string.h>
#include <malloc.h>
include <newdev.h> define ARRAYSIZE(x) (sizeof(x)/sizeof(x[0]))
define INSTANCEID_PREFIX_CHAR TEXT('@') // character used to prefix instance ID's
#define CLASS_PREFIX_CHAR     TEXT('=') // character used to prefix class name
#define WILD_CHAR             TEXT('*') // wild character
#define QUOTE_PREFIX_CHAR     TEXT('\'') // prefix character to ignore wild characters
```

UNITED STATES PATENT AND TRADEMARK OFFICE
CERTIFICATE OF CORRECTION

PATENT NO.        : 7,325,170 B2
APPLICATION NO.   : 10/804290
DATED             : January 29, 2008
INVENTOR(S)       : Karamadai Srinivasan et al.

It is certified that error appears in the above-identified patent and that said Letters Patent is hereby corrected as shown below:

```
int EnumerateDevice();
int removeDevice(char *devID);
LPTSTR GetDeviceDescription(HDEVINFO Devs,PSP_DEVINFO_DATA DevInfo);

BOOL DumpDeviceDescr(HDEVINFO Devs,PSP_DEVINFO_DATA DevInfo); BOOL
DumpDeviceStatus(HDEVINFO Devs,PSP_DEVINFO_DATA DevInfo); BOOL
DumpDeviceWithInfo(HDEVINFO Devs,PSP_DEVINFO_DATA DevInfo,LPCTSTR Info);

#ifdef _UNICODE
#define UPDATEDRIVERFORPLUGANDPLAYDEVICES
"UpdateDriverForPlugAndPlayDevicesW"
#else
#define UPDATEDRIVERFORPLUGANDPLAYDEVICES
"UpdateDriverForPlugAndPlayDevicesA"
endif //
// exit codes
//
#define EXIT_OK    (0)
#define EXIT_REBOOT (1)
#define EXIT_FAIL  (2)
#define EXIT_USAGE (3)
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
typedef struct {
   DWORD count;
   DWORD control;
   BOOL reboot;
   LPCTSTR strSuccess;
   LPCTSTR strReboot;
   LPCTSTR strFail;
}
GenericContext;

#define FIND_DEVICE      0x00000001 // display device
#define FIND_STATUS      0x00000002 // display status of device
#define FIND_RESOURCES   0x00000004 // display resources of device
#define FIND_DRIVERS     0x00000008 // display drivers used by device
#define FIND_HWIDS       0x00000010 // display hw/compat id's used by device
#define FIND_DRIVERNODES 0x00000020 // display driver nodes for a device.

Devcon.cpp
==========
#include "devcon.h"
#include <string.h>

FILE *stream;
char *outfile;
```

UNITED STATES PATENT AND TRADEMARK OFFICE
CERTIFICATE OF CORRECTION

PATENT NO.        : 7,325,170 B2
APPLICATION NO.   : 10/804290
DATED             : January 29, 2008
INVENTOR(S)       : Karamadai Srinivasan et al.

It is certified that error appears in the above-identified patent and that said Letters Patent is hereby corrected as shown below:

```
TCHAR      szBuffer [6000];

void EncodeXMLString(string szInput, string& szOutput)
{
string strBuffer;
size_t nFirstIndex;
strBuffer = szInput;
nFirstIndex = strBuffer.find(_T(">"), 0);
while (nFirstIndex != string::npos)
{
 strBuffer = strBuffer.replace(nFirstIndex, _tcslen(_T("1")), _T(">"));
 nFirstIndex = strBuffer.find(_T(">"), nFirstIndex+1);
}
 nFirstIndex = strBuffer.find(_T("<"), 0);
while (nFirstIndex != string::npos)
{
 strBuffer = strBuffer.replace(nFirstIndex, _tcslen(_T("1")), _T("<"));
 nFirstIndex = strBuffer.find(_T("<"), nFirstIndex+1);
}
 nFirstIndex = strBuffer.find(_T("""), 0);
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
while (nFirstIndex != string::npos)
{
 strBuffer = strBuffer.replace(nFirstIndex, _tcslen(_T("'")), _T("'"));
 nFirstIndex = strBuffer.find(_T("'"), nFirstIndex+1);
}
nFirstIndex = strBuffer.find(_T("\""), 0);
while (nFirstIndex != string::npos)
{
 strBuffer = strBuffer.replace(nFirstIndex, _tcslen(_T("'")), _T("""));
 nFirstIndex = strBuffer.find(_T("\""), nFirstIndex+1);
}
nFirstIndex = strBuffer.find(_T("&"), 0);
while (nFirstIndex != string::npos)
{
 if (nFirstIndex != strBuffer.find(_T("&"), nFirstIndex) &&
  nFirstIndex != strBuffer.find(_T(">"), nFirstIndex) &&
  nFirstIndex != strBuffer.find(_T("<"), nFirstIndex) &&
  nFirstIndex != strBuffer.find(_T("'"), nFirstIndex) &&
  nFirstIndex != strBuffer.find(_T("""), nFirstIndex))
 {
  strBuffer = strBuffer.replace(nFirstIndex, 1, _T("&"));
 }
 nFirstIndex = strBuffer.find(_T("&"), nFirstIndex+1);
}
 szOutput = strBuffer;
} //EncodeXMLString
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
LPTSTR GetDeviceStringProperty(HDEVINFO Devs,PSP_DEVINFO_DATA
DevInfo,DWORD
Prop)
{
   LPTSTR buffer;
   DWORD size;
   DWORD reqSize;
   DWORD dataType;
   DWORD szChars;
   size = 1024;
   buffer = new TCHAR[(size/sizeof(TCHAR))+1];
   if(!buffer)
      {
      return NULL;
      }
   while(!SetupDiGetDeviceRegistryProperty(Devs,DevInfo,Prop,&dataType,(LPBYTE)
buffer,size,&reqSize))
      {
      if(GetLastError() != ERROR_INSUFFICIENT_BUFFER) {
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
         goto failed;
      }
      if(dataType != REG_SZ) {
         goto failed;
      }
      size = reqSize;
      delete [] buffer;
      buffer = new TCHAR[(size/sizeof(TCHAR))+1];
      if(!buffer) {
         goto failed;
      }
   }
   szChars = reqSize/sizeof(TCHAR);
   buffer[szChars] = TEXT('\0');
   return buffer;
failed:
   if(buffer) {
      delete [] buffer;
   }
   return NULL;
}
```

UNITED STATES PATENT AND TRADEMARK OFFICE
CERTIFICATE OF CORRECTION

PATENT NO.        : 7,325,170 B2
APPLICATION NO.   : 10/804290
DATED             : January 29, 2008
INVENTOR(S)       : Karamadai Srinivasan et al.

It is certified that error appears in the above-identified patent and that said Letters Patent is hereby corrected as shown below:

```
LPTSTR GetDeviceDescription(HDEVINFO Devs,PSP_DEVINFO_DATA DevInfo)
   LPTSTR desc;
   desc = GetDeviceStringProperty(Devs,DevInfo,SPDRP_FRIENDLYNAME);
   if(!desc) {
       desc = GetDeviceStringProperty(Devs,DevInfo,SPDRP_DEVICEDESC);
   }
   return desc;
} void replaceStr(char *Str,char *newDevId, char ch)
{
        char *word;
        word = strtok(Str,"&");
        strcpy(newDevId,word);
        while(word!=NULL)
        {
                word = strtok(NULL,"&");
                if(word==NULL) break;
                strcat(newDevId,"&");
                strcat(newDevId,word);
        }
    return;
}
```

UNITED STATES PATENT AND TRADEMARK OFFICE
CERTIFICATE OF CORRECTION

| | | |
|---|---|---|
| PATENT NO. | : 7,325,170 B2 | |
| APPLICATION NO. | : 10/804290 | |
| DATED | : January 29, 2008 | |
| INVENTOR(S) | : Karamadai Srinivasan et al. | |

It is certified that error appears in the above-identified patent and that said Letters Patent is hereby corrected as shown below:

```
BOOL DumpDeviceWithInfo(HDEVINFO Devs,PSP_DEVINFO_DATA DevInfo,LPCTSTR
Info) {
   TCHAR devID[MAX_DEVICE_ID_LEN];
   BOOL b = TRUE;
   SP_DEVINFO_LIST_DETAIL_DATA devInfoListDetail;
   devInfoListDetail.cbSize = sizeof(devInfoListDetail);
if(CM_Get_Device_ID(DevInfo-
>DevInst,devID,MAX_DEVICE_ID_LEN,0)!=CR_SUCCESS)
     {
    lstrcpy(devID,TEXT("?"));
    b = FALSE;
   }
       string szDevID=devID;
       string szOutputDevId;
       EncodeXMLString(szDevID,szOutputDevId);
       printf("\n%s",szOutputDevId.c_str());
fprintf(stream,"\n\t\t<DeviceID>\"%s\"</DeviceID>",szOutputDevId.c_str());
   return b;
}
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
BOOL DumpDeviceDescr(HDEVINFO Devs,PSP_DEVINFO_DATA DevInfo)
{
   LPTSTR desc;
       const int    iStringMaximumLength_c = 8048;
       WCHAR            szwBigBuffer[iStringMaximumLength_c];
       const int    iMaxEight_c = 10096;
       CHAR         szBigBuffer[iMaxEight_c];
    desc = GetDeviceDescription(Devs,DevInfo);
    if(!desc) {
            printf("\nDevice Description is not available for this device");
       return FALSE;
    }
       MultiByteToWideChar(CP_ACP, 0, desc, -1, szwBigBuffer,
sizeof(szwBigBuffer));
       WideCharToMultiByte(CP_UTF8, 0, szwBigBuffer, -1, szBigBuffer,
sizeof(szBigBuffer), NULL, NULL);
fprintf(stream,"\n\t\t<DeviceDescription>\"%s\"</DeviceDescription>",szBigBu
ffer);
    printf("\n%s",desc);
    delete [] desc;
    return TRUE;
}

BOOL DumpDeviceStatus(HDEVINFO Devs,PSP_DEVINFO_DATA DevInfo)
{
   SP_DEVINFO_LIST_DETAIL_DATA devInfoListDetail;
```

UNITED STATES PATENT AND TRADEMARK OFFICE
CERTIFICATE OF CORRECTION

| | | |
|---|---|---|
| PATENT NO. | : 7,325,170 B2 | |
| APPLICATION NO. | : 10/804290 | |
| DATED | : January 29, 2008 | |
| INVENTOR(S) | : Karamadai Srinivasan et al. | |

It is certified that error appears in the above-identified patent and that said Letters Patent is hereby corrected as shown below:

```
   ULONG status = 0;
   ULONG problem = 0;
   BOOL hasInfo = FALSE;
       CMAPI CONFIGRET WINAPI    CM_Get_DevNode_Status(OUT PULONG
puIStatus,OUT PULONG  pulProblemNumber,IN DEVINST  dnDevInst,IN ULONG ulFlags );
   devInfoListDetail.cbSize = sizeof(devInfoListDetail);
if(CM_Get_DevNode_Status(&status,&problem,DevInfo->DevInst,0)!=CR_SUCCESS)
       {
     return FALSE;
   }
       printf("\nError Code : %i",problem);
       fprintf(stream,"\n\t\t<ErrorCode>%i</ErrorCode>",problem);
   if((status & DN_HAS_PROBLEM) && problem == CM_PROB_DISABLED)
       {
     hasInfo = TRUE;
     printf("\n%s","Device is disabled");
           fprintf(stream,"\n\t\t<Status>\"%s\"</Status>","Device is disabled");
     return TRUE;
   }
   if(status & DN_HAS_PROBLEM)
       {
     hasInfo = TRUE;
       printf("\n%s","Device has a problem");
           fprintf(stream,"\n\t\t<Status>\"%s\"</Status>","Device has a problem");
   }
   if(status & DN_PRIVATE_PROBLEM)
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
       {
      hasInfo = TRUE;
      printf("\n%s","Device has a problem reported by the driver");
              fprintf(stream,"\n\t\t<Status>\"%s\"</Status>","Device has a problem reported by
the driver");
      }
    if(status & DN_STARTED)
         {
      printf("\n%s","Device has been started");
              fprintf(stream,"\n\t\t<Status>\"%s\"</Status>","Device has been started");
      }
        else if (!hasInfo)
         {
              fprintf(stream,"\n\t\t<Status>\"%s\"</Status>","Device is currently stopped");
      printf("\nDevice is currently stopped");
      }
    return TRUE;
 } int GetDeviceInfoAndDelete(char * devIDtoDelete)
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
{
        HDEVINFO devs = INVALID_HANDLE_VALUE;
    DWORD err;
    int failcode = EXIT_FAIL;
    DWORD devIndex;
    SP_DEVINFO_DATA devInfo;
    SP_DEVINFO_LIST_DETAIL_DATA devInfoListDetail;
    BOOL matchFound = FALSE;
    SP_REMOVEDEVICE_PARAMS rmdParams;
    LPCTSTR action = NULL;
    TCHAR devID[MAX_DEVICE_ID_LEN];
        devInfoListDetail.cbSize = sizeof(devInfoListDetail);
        printf("Device to be deleted is %s", devIDtoDelete);
    devs = SetupDiGetClassDevs(
NULL,NULL,NULL,DIGCF_ALLCLASSES|DIGCF_PRESENT);
        if(devs == INVALID_HANDLE_VALUE)
        {
                err = GetLastError();
                printf( "SetupDiGetClassDevs failed: %lx.\n", err );
                failcode=EXIT_FAIL;
                goto final;
        }
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
        devInfoListDetail.RemoteMachineHandle = NULL;
        strcpy(devInfoListDetail.RemoteMachineName,"");
    devInfoListDetail.cbSize = sizeof(devInfoListDetail);
        devInfoListDetail.cbSize = sizeof(SP_DEVINFO_LIST_DETAIL_DATA);
    devInfo.cbSize = sizeof(devInfo);
    for(devIndex=0;SetupDiEnumDeviceInfo(devs,devIndex,&devInfo);devIndex++)
        {
    if(CM_Get_Device_ID(devInfo.DevInst,devID,MAX_DEVICE_ID_LEN,0)!=CR_SUCCESS)
            {
                lstrcpy(devID,TEXT("?"));
            }
            printf("Dev ID for comparison is : %s \n",devID);
            if(strcmp(devID,devIDtoDelete)==0)
            {
                printf("\n match found");
                matchFound = TRUE;
                rmdParams.ClassInstallHeader.cbSize =
sizeof(SP_CLASSINSTALL_HEADER);
                rmdParams.ClassInstallHeader.InstallFunction =
DIF_REMOVE;
                rmdParams.Scope = DI_REMOVEDEVICE_GLOBAL;
                rmdParams.HwProfile = 0;
    if(!SetupDiSetClassInstallParams(devs,&devInfo,&rmdParams.ClassInstallHeader
    sizeof(rmdParams)) ||!SetupDiCallClassInstaller(DIF_REMOVE,devs,&devInfo))
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
                {
                        failcode = EXIT_FAIL;
                        goto final;
                }
                printf("\n\n Device has been deleted");
                break;
        }
    }
    // The device was deleted!!
    if(matchFound == FALSE)
    {
            printf("\n\n No matching device id found!!");
            failcode = EXIT_FAIL;
    }
    else
    {
            failcode = EXIT_OK;
    }
final:
    if(devs != INVALID_HANDLE_VALUE) {
            printf("destorying DevsInfoList");
        SetupDiDestroyDeviceInfoList(devs);
            printf("After destorying DevsInfoList");
    }
    return failcode;
}
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
int EnumerateDevice()
{
   HDEVINFO devs = INVALID_HANDLE_VALUE;
   DWORD err;
   int failcode = EXIT_FAIL;
   DWORD devIndex;
   SP_DEVINFO_DATA devInfo;
   SP_DEVINFO_LIST_DETAIL_DATA devInfoListDetail;
   DWORD numClass = 0;
   int skip = 0;
        devs = SetupDiGetClassDevs(
NULL,NULL,NULL,DIGCF_ALLCLASSES|DIGCF_PRESENT);
        //devs = SetupDiGetClassDevs(
NULL,NULL,NULL,DIGCF_ALLCLASSES|DIGCF_PROFILE);
        if(devs == INVALID_HANDLE_VALUE)
        {
                err = GetLastError();
                printf( "SetupDiGetClassDevsEx failed: %lx.\n", err );
                failcode= EXIT_FAIL;
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
            goto final;
    }
    devInfoListDetail.RemoteMachineHandle = NULL;
    strcpy(devInfoListDetail.RemoteMachineName,"");
devInfoListDetail.cbSize = sizeof(devInfoListDetail);
    devInfoListDetail.cbSize = sizeof(SP_DEVINFO_LIST_DETAIL_DATA);
    devInfo.cbSize = sizeof(devInfo);
for(devIndex=0;SetupDiEnumDeviceInfo(devs,devIndex,&devInfo);devIndex++)
        {
        TCHAR devID[MAX_DEVICE_ID_LEN];
if(CM_Get_Device_ID(devInfo.DevInst,devID,MAX_DEVICE_ID_LEN,0)!=CR_SUCCESS)
            {
     '       lstrcpy(devID,TEXT("?"));
            }
//          printf("Dev ID for comparison is : %s \n",devID);
        printf("\n\n");
            fprintf(stream,"\n\t<Device>");
            if(!DumpDeviceWithInfo(devs,&devInfo,NULL)) return EXIT_OK;
        DumpDeviceDescr(devs,&devInfo);
            DumpDeviceStatus(devs,&devInfo);
            fprintf(stream,"\n\t</Device>");
```

UNITED STATES PATENT AND TRADEMARK OFFICE
CERTIFICATE OF CORRECTION

PATENT NO.        : 7,325,170 B2
APPLICATION NO.   : 10/804290
DATED             : January 29, 2008
INVENTOR(S)       : Karamadai Srinivasan et al.

It is certified that error appears in the above-identified patent and that said Letters Patent is hereby corrected as shown below:

```
    }
    failcode = EXIT_OK;
final:
    if(devs != INVALID_HANDLE_VALUE) {
        SetupDiDestroyDeviceInfoList(devs);
    }
    return failcode;
} int removeDevice(char *devID)
{
        printf("%s",devID);
        return GetDeviceInfoAndDelete(devID);
} int listDeviceStatus()
{
        int result;
        if(outfile!=NULL)
        {
                stream = fopen(outfile, "w" );
        }
        else
        {
                stream = fopen("devlist.xml", "w" );
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
    }
        fprintf(stream,"<DeviceManager>");
    result = EnumerateDevice();
        fprintf(stream,"\n</DeviceManager>");
        fclose( stream );
        return result;
} void writeReturnCode(int code)
{
        FILE *Ostream;
        Ostream = fopen( "DMStatus.out", "w" );
        fprintf(Ostream,"%i",code);
        fclose(Ostream);
} void main(int argc,LPTSTR argv[])
{
        int retval;
        if(argc<2)
        {
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
            printf("Wrong arguments");
            writeReturnCode(3);
            exit(3);
    }
    if(strcmp(argv[1],"remove")==0)
    {
            //Check if the id is specified
            printf("calling remove device %s ", argv[2]);
            if(argv[2]==NULL)
            {
                    printf("Missing device id");
                    writeReturnCode(3);
                    exit(3);
            }
            retval = removeDevice(argv[2]);
            writeReturnCode(retval);
            exit(retval);
    }
    if(strcmp(argv[1],"status")==0)
    {
            // if the out file name is specified
            if(argc==3)
            {
                    outfile =argv[2];
            }
```

UNITED STATES PATENT AND TRADEMARK OFFICE
CERTIFICATE OF CORRECTION

PATENT NO. : 7,325,170 B2
APPLICATION NO. : 10/804290
DATED : January 29, 2008
INVENTOR(S) : Karamadai Srinivasan et al.

It is certified that error appears in the above-identified patent and that said Letters Patent is hereby corrected as shown below:

```
            printf("Calling status");
            retval = listDeviceStatus();
            writeReturnCode(retval);
            exit(retval);
        }
        writeReturnCode(2);
        exit(2);
    }
```

--.

In column 16, line 2, in Claim 3, delete "Suitable" and insert -- suitable --, therefor.

In column 16, line 52, in Claim 9, delete "deivce" and insert -- device --, therefor.

Signed and Sealed this

Fifth Day of August, 2008

JON W. DUDAS
*Director of the United States Patent and Trademark Office*